(12) United States Patent
Reynolds et al.

(10) Patent No.: US 10,244,000 B2
(45) Date of Patent: Mar. 26, 2019

(54) APPARATUS AND METHOD FOR ESTABLISHING SEAMLESS SECURE COMMUNICATIONS BETWEEN COMPONENTS IN AN INDUSTRIAL CONTROL AND AUTOMATION SYSTEM

(71) Applicant: Honeywell International Inc., Morristown, NJ (US)

(72) Inventors: Brian Reynolds, Philadelphia, PA (US); Senthilkumar Dhanagopalan, Bangalore (IN); Ritwik Ganguly, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 937 days.

(21) Appl. No.: 14/460,256

(22) Filed: Aug. 14, 2014

(65) Prior Publication Data
US 2015/0244742 A1    Aug. 27, 2015

Related U.S. Application Data

(60) Provisional application No. 61/943,806, filed on Feb. 24, 2014.

(51) Int. Cl.
 *H04L 29/06* (2006.01)
 *G05B 19/042* (2006.01)
 *G05B 19/418* (2006.01)

(52) U.S. Cl.
 CPC ........ *H04L 63/205* (2013.01); *G05B 19/0426* (2013.01); *G05B 19/4185* (2013.01);
 (Continued)

(58) Field of Classification Search
 CPC ...................................................... H04L 63/20
 See application file for complete search history.

(56) References Cited

U.S. PATENT DOCUMENTS 7,284,278 B2    10/2007  Anson et al.
7,574,603 B2 *   8/2009  Swander ............... H04L 63/061
                                                        713/171
(Continued)

OTHER PUBLICATIONS

How IPSec Works: Security Policy; Security Services, Mar. 28, 2003, (copyright—Microsoft), 31 pages.
(Continued)

*Primary Examiner* — Kambiz Zand
*Assistant Examiner* — Thanh H Le

(57) ABSTRACT

A method includes establishing, using a connection policy at a first device, a security association with a second device of an industrial process control and automation system. The method also includes, once the security association is established, activating a process data policy at the first device. The security association is established during first and second types of negotiations. The process data policy is activated during the second type of negotiation without the first type of negotiation. The second type of negotiation is faster than the first type of negotiation. The connection policy defines a communication channel between the devices using a non-process communication port of the first device. The process data policy defines a communication channel between the devices for real-time industrial process data. The first type of negotiation could include an IKE main mode negotiation, and the second type of negotiation could include an IKE quick mode negotiation.

20 Claims, 4 Drawing Sheets

(52) U.S. Cl.
CPC .......... *H04L 63/061* (2013.01); *H04L 63/164* (2013.01); *G05B 2219/23317* (2013.01); *Y02P 90/18* (2015.11)

(56) References Cited

U.S. PATENT DOCUMENTS

| | | | |
|---|---|---|---|
| 8,190,888 B2* | 5/2012 | Batke | H04L 63/061 |
| | | | 713/166 |
| 8,631,155 B2* | 1/2014 | Gopalakrishnan | H04L 29/12528 |
| | | | 709/245 |
| 8,769,143 B2* | 7/2014 | Meredith | H04L 63/0263 |
| | | | 709/232 |
| 8,873,746 B2 | 10/2014 | Long et al. | |
| 9,038,162 B2 | 5/2015 | Hegiu et al. | |
| 2004/0177264 A1 | 9/2004 | Anson et al. | |
| 2005/0102514 A1 | 5/2005 | Bergenwall et al. | |
| 2009/0276537 A1 | 11/2009 | Deverick et al. | |
| 2011/0182427 A1 | 7/2011 | Long et al. | |
| 2012/0266214 A1 | 10/2012 | Hegiu et al. | |

OTHER PUBLICATIONS

IPSec—Wikipedia, Retrieved from "http://en.wikipedia.org/w/index.php?title=IPsec&oldid=619949512#Encapsulating_Security_Payload" Aug. 5, 2014, 10 pages.

International Search Report dated Apr. 28, 2015 in connection with International Application No. PCT/US2015/015337; 3 pages.

Written Opinion of the International Searching Authority dated Apr. 28, 2015 in connection with international Application No. PCT/US2015/015337; 4 pages.

\* cited by examiner

APPARATUS AND METHOD FOR ESTABLISHING SEAMLESS SECURE COMMUNICATIONS BETWEEN COMPONENTS IN AN INDUSTRIAL CONTROL AND AUTOMATION SYSTEM

CROSS-REFERENCE TO RELATED APPLICATION AND PRIORITY CLAIM

This application claims priority under 35 U.S.C. § 119(e) to U.S. Provisional Patent Application No. 61/943,806 filed on Feb. 24, 2014. This provisional patent application is hereby incorporated by reference in its entirety.

TECHNICAL FIELD

This disclosure relates generally to industrial control and automation systems. More specifically, this disclosure relates to an apparatus and method for establishing seamless secure communications between components in an industrial control and automation system.

BACKGROUND

Industrial process control and automation systems are often used to automate large and complex industrial processes. These types of systems routinely include various components such as servers, clients, sensors, transmitters, and field devices that are used to control and automate an entire industrial plant. The communication and transport of critical process data among these components play a major role in automation and maintenance of plant operations. Data transfers between these components are also potential security vulnerabilities. As a result, authenticated and encrypted communications can be used to maintain plant operations without any intentional or unintentional interference.

SUMMARY

This disclosure provides an apparatus and method for establishing seamless secure communications between components in an industrial control and automation system In a first embodiment, a method includes establishing, using a connection policy at a first device, a security association with a second device of an industrial process control and automation system. The method also includes, once the security association is established, activating a process data policy at the first device. The security association is established during first and second types of negotiations and the process data policy is activated during the second type of negotiation without the first type of negotiation, where the second type of negotiation is faster than the first type of negotiation. The connection policy defines a communication channel between the devices using a non-process communication port of the first device. The process data policy defines a communication channel between the devices for real-time industrial process data.

In a second embodiment, an apparatus includes a first distributed control system (DCS) device, which includes at least one interface and at least one processing device. The at least one interface is configured to communicate with a second DCS device. The at least one processing device is configured to establish, using a connection policy, a security association with the second DCS device. The at least one processing device is also configured, once the security association is established, to activate a process data policy. The at least one processing device is configured to establish the security association during first and second types of negotiations and to activate the process data policy during the second type of negotiation without the first type of negotiation, where the second type of negotiation is faster than the first type of negotiation. The connection policy defines a communication channel between the DCS devices using a non-process communication port of the first DCS device. The process data policy defines a communication channel between the DCS devices for real-time industrial process data.

In a third embodiment, a non-transitory computer readable medium embodies a computer program. The computer program includes computer readable program code for establishing, using a connection policy at a first device, a security association with a second device of an industrial process control and automation system. The computer program also includes computer readable program code for, once the security association is established, activating a process data policy at the first device. The security association is established during first and second types of negotiations and the process data policy is activated during the second type of negotiation without the first type of negotiation, where the second type of negotiation is faster than the first type of negotiation. The connection policy defines a communication channel between the devices using a non-process communication port of the first device. The process data policy defines a communication channel between the devices for real-time industrial process data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
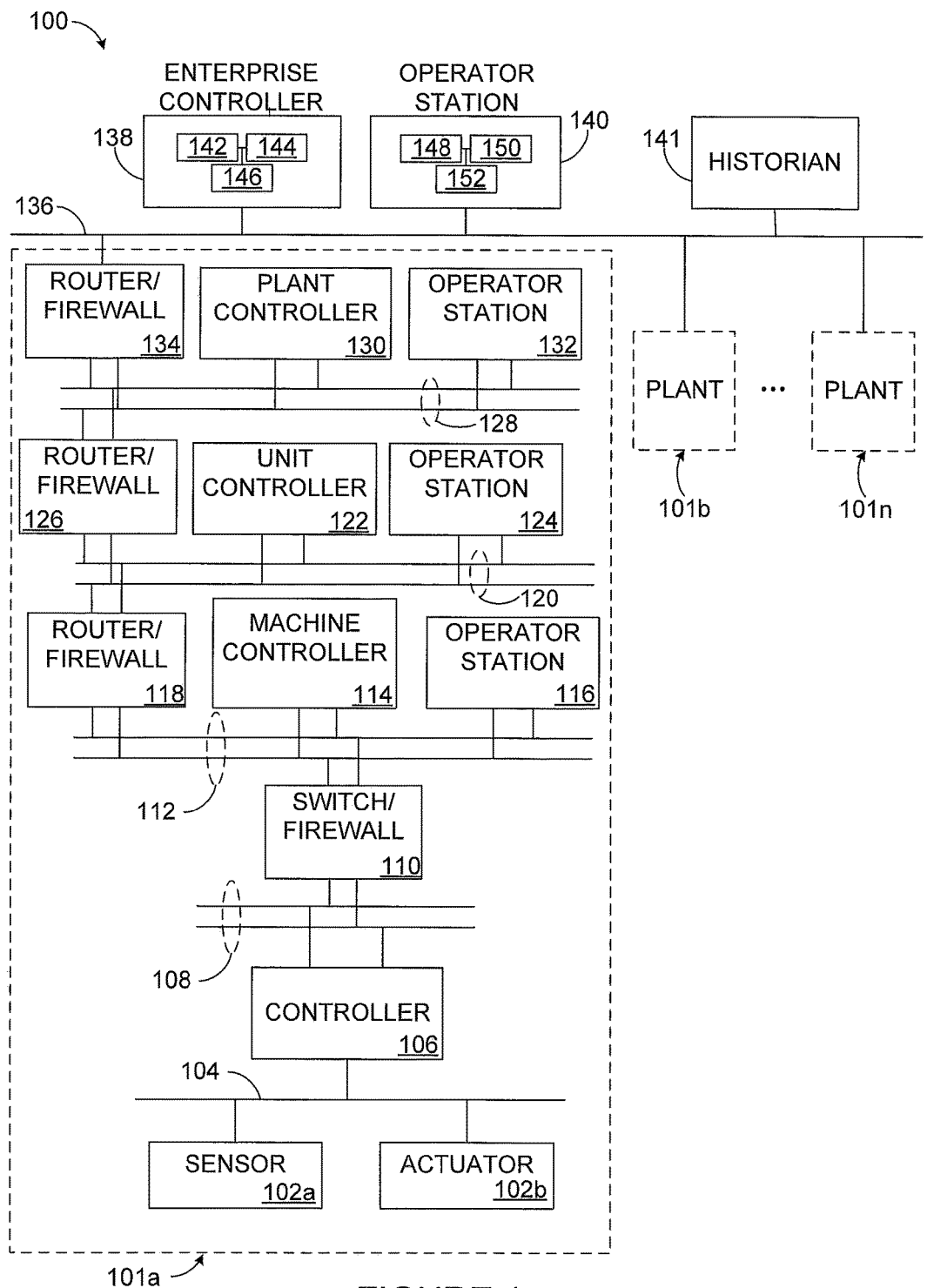
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As noted above, security is a concern in industrial process control and automation systems, and various components in FIG. 1 may need a highly-secure mode of authenticated and encrypted communications in order to maintain plant operations without intentional or unintentional interference. Secure communications between components often involve using a set of methods and protocols to provide authentication and encryption of data transferred between the components. The Internet Protocol Security (IPsec) suite is one example of a protocol suite for securing Internet Protocol (IP) communications. IPsec operates by authenticating and encrypting each IP packet of a communication session.

Secure communication protocols provide various ways for establishing mutual authentication between devices at the beginning of a communication session and for negotiating cryptographic keys to be used during the communication session. The time needed to negotiate and establish a secure communication channel is often not deterministic and depends on various factors, such as current network traffic, dropped packets, transmission failures, system resources (such as CPU/RAM resources), and "dual negotiation thrashing." Dual negotiation thrashing refers to a situation in which two devices start negotiating with each other simultaneously or almost simultaneously, resulting in negotiation failures and retries. This can happen frequently in non-client/server environments, such as in industrial process control and automation systems (since multiple control applications can initiate data transfers that need to be authenticated and encrypted under a security policy).

These factors can result in significantly longer times for establishing a secure communication tunnel. As a result, real-time and historical process data could be lost. The sudden unavailability of live process data values may cause unwanted disturbances, such as false alarms, invalid operator displays, or safety and security vulnerabilities in a portion of an industrial process (which could cause a loss of revenue or a plant shutdown).

This disclosure provides techniques for establishing secure communications within an industrial process control and automation system. For example, a secure association can be established between devices using a Connection Policy ahead of a Process Data Policy. In this disclosure, a "Connection Policy" refers to a secure communication channel between devices using a specific non-process communication port and sending/receiving non-process data messages. A "Process Data Policy" refers to a secure communication channel between devices for real-time distributed control system (DCS) process data. A Process Data Policy defines the secured system topology and determines which nodes are to be secured, which nodes can communicate with each other, policy activation times, and how data is passed (such as Clear-Text, Authentication Only, or Authentication and Encryption). In some embodiments, a Process Data Policy can be configured by a security administrator or other user.

Since secure associations can be established between devices using a Connection Policy, the system 100 has already authenticated peer devices and can use the already-established secure association for negotiation and key exchange by the time that a Process Data Policy is deployed. This reduces negotiation thrashing, increases system availability, and reduces or minimizes interruptions to process data publications. This could be useful in various situations, such as during an online migration from a non-secure industrial process control and automation system to a secure industrial process control and automation system. In this situation, devices in the system 100 are switched from using unsecure communication channels to secure communication channels while ideally minimizing the loss of process data during the switching to secure communications.

As a specific example, consider a system using IPsec as the protocol suite. In Internet Key Exchange (IKE), negotiations between devices occur in two steps. The Main Mode (MM) negotiation authenticates and/or encrypts the peers to be secured, while the Quick Mode (QM) negotiation identifies algorithms to be used to secure the traffic between the peers. QM negotiation takes significantly less time than MM plus QM negotiations, thereby reducing the probability of process data being lost between secured nodes. According to this disclosure, IKE phase 1 involves authenticating an IPsec peer and establishing an IKE global MM negotiation as part of a Connection Policy. This phase is completed ahead of the deployment of a DCS Process Data Policy. This in turn may result in only IKE phase 2 QM negotiation being used for the Process Data Policy deployment.

The approaches described here can establish a secure communication channel while reducing or avoiding dual negotiation thrashing by helping to ensure that only one device initiates a negotiation between two devices. This is often the case in a client-server architecture in which the client would typically be the initiator. In a DCS running in a non-secure manner, process data is typically published by many or all nodes. Ordinarily, in order to guarantee only one initiator, a system would have to halt all process data publications. In accordance with this disclosure, a separate policy performs the authentication ahead of time in a deterministic manner without affecting process data publications. The approaches described here also help to ensure that a secure association is successfully established before a Process Data Policy is deployed. There may be little or no interruption of process data publications while peer authentication occurs and a secure channel is being established.

In some embodiments, the system 100 uses a Connection Policy to create a separate secure channel ahead of any changes to a Process Data Policy and terminates a tunnel after the Process Data Policy changes are negotiated. In other embodiments, the system 100 keeps the Connection Policy secure tunnel active (for an IPsec solution, this can be achieved by sending periodic non-process data messages). For an IPsec-based solution, the Connection Policy secure channel can be opened on a separate port from any Process Data communication ports.

Additional details regarding this functionality are provided below. Note that while described below as involving two or three devices, this functionality could be used in any suitable system containing any suitable number of devices.

Although FIG. 1 illustrates one example of an industrial process control and automation system 100, various changes may be made to FIG. 1. For example, a control system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which establishing seamless secure communications between components can be used. This functionality can be used in any other suitable device or system.

Figure 2:
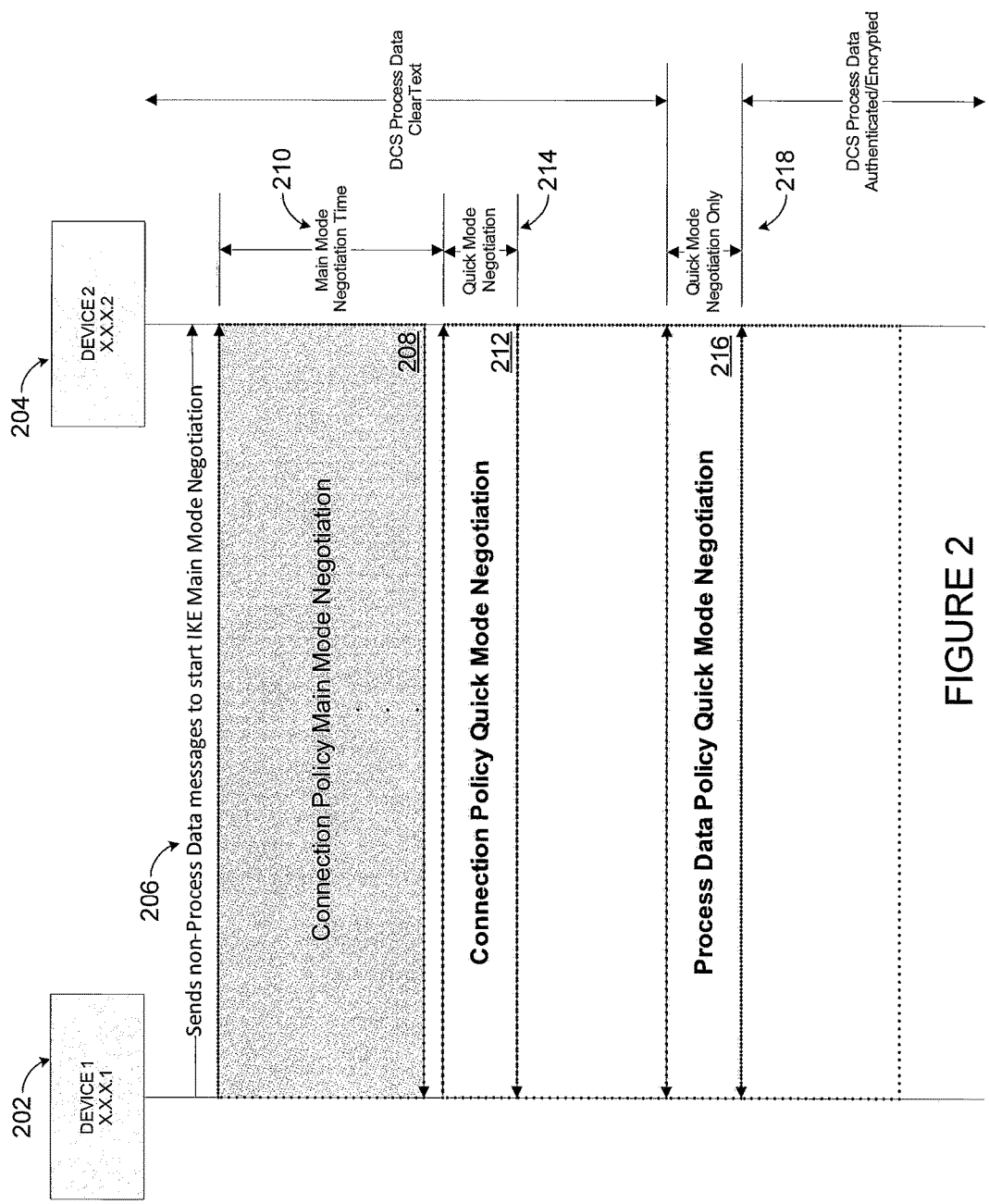
FIG. 2 illustrates an example technique for establishing seamless secure communications between components in an industrial process control and automation system according to this disclosure.

FIG. 2 illustrates an example technique for establishing seamless secure communications between components in an industrial process control and automation system according to this disclosure. In particular, FIG. 2 illustrates an example technique implemented using an IPsec-based solution, although other protocols could also be used.

As shown in FIG. 2, communications between two DCS devices 202-204 can be protected as described below. The DCS devices 202-204 could represent any suitable devices in a DCS, such as any of the controllers, operator stations, or other components shown in FIG. 1. The DCS devices 202-204 here are assigned two network addresses (X.X.X.1 and X.X.X.2), although these addresses are for illustration only.

The technique shown in FIG. 2 is initiated when the DCS device 202 transmits a non-process data message 206 to the DCS device 204. The non-process data message 206 denotes a data message that initiates secure channel negotiations between the DCS devices 202-204 and is sent to a port of the DCS device 204 that is not ordinarily used for sending/receiving DCS process-related data. The message 206 invokes IKE Main Mode (MM) negotiations 208 between the DCS devices 202-204, which can occur over a longer period of time 210. This is followed by IKE Quick Mode (QM) negotiations 212, which can occur over a shorter period of time 214. The MM negotiations 208 and the QM negotiations 212 could occur as defined in the IKE standard. In this way, a Connection Policy can be used between the DCS devices 202-204 to establish a secure association between the DCS devices 202-204.

After the MM negotiations 208 and the QM negotiations 212 are completed, a Process Data Policy can be deployed using the secure association already established between the DCS devices 202-204. Because the secure association has already been established, the Process Data Policy can be established using QM negotiations 216, which can occur over a period of time 218 that is shorter than the combined period of time needed for the Connection Policy.

Before completion of the QM negotiations 216, the DCS devices 202-204 could communicate process-related data as clear text (unencrypted data). Upon completion of the QM negotiations 216, the DCS devices 202-204 are authenticated and can communicate process-related data as encrypted data.

In this example, one or more Process Data Policies can be configured, such as by a user. The system can deploy the Process Data Policies to various devices, such as to all devices to be secured. Any suitable technique could be used to configure or define Process Data Policies for DCS devices. The system also establishes security associations between devices using Connection Policies. Once the security associations are established, the system activates the Process Data Policies, such as according to configured activation times. In some embodiments, the Process Data Policies can apply to all ports and all TCP/IP communications (or other network-based communications) of the devices. Note that only QM negotiations may be needed for a Process Data Policy because the MM negotiations previously occurred in the preceding step (during the establishment of the security associations).

Figure 3:
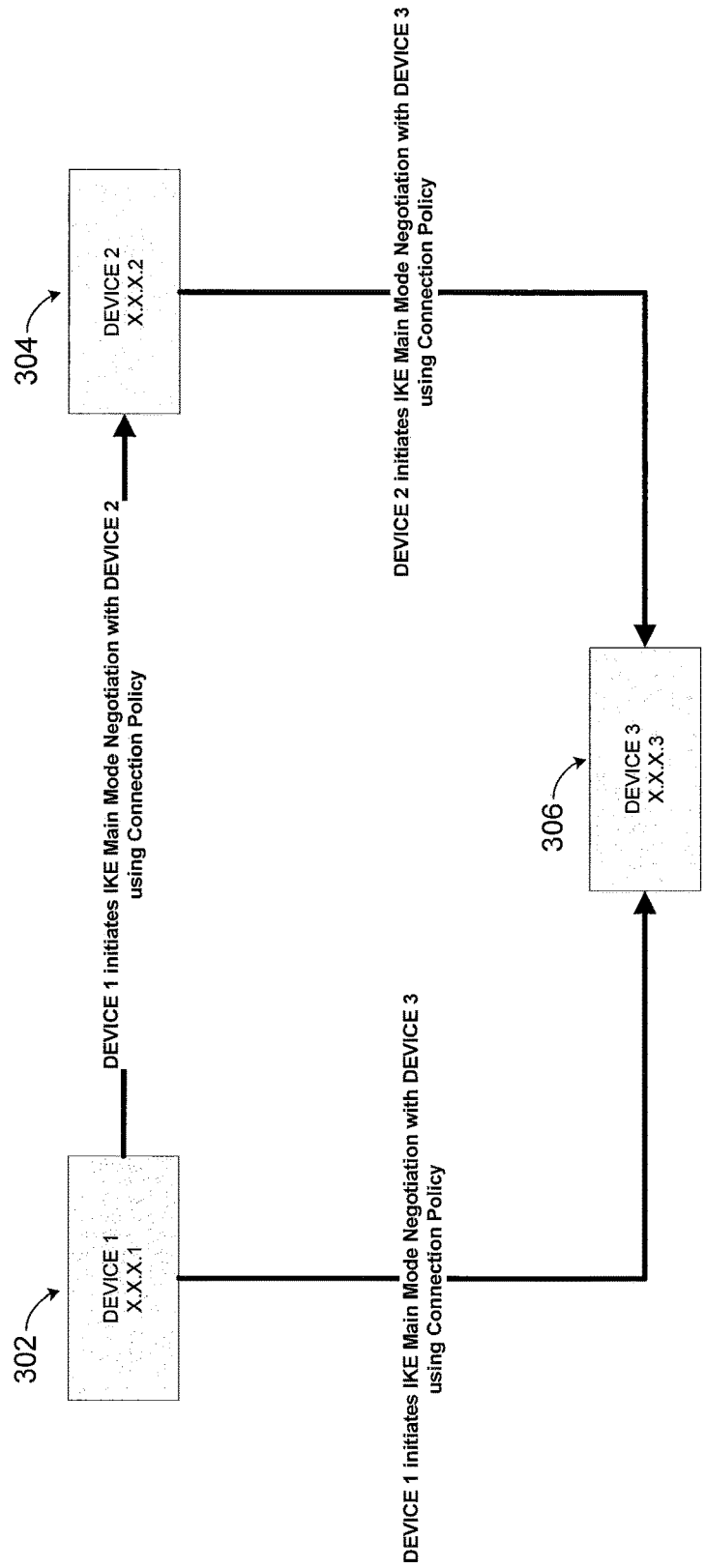
FIG. 3 illustrates an example technique for initiating secure channel negotiations between components in an industrial process control and automation system according to this disclosure.

A security association between devices can be established when one device 202 sends one or more non-process data messages 206 on a specific non-process communication port to another device 204 to be secured. This can initiate IKE negotiations, which establish the MM and QM. The non-process port can represent a port that is not used by any DCS application and that does not affect process data communications. To avoid dual IKE MM negotiation thrashing between two devices, only one device may initiate the negotiation. For example, the device with a lower IP address could send the first message to start IKE negotiations. An example of this is shown in FIG. 3, where three DCS devices 302-306 (assigned network addresses X.X.X.1, X.X.X.2, and X.X.X.3) initiate IKE negotiations from a device with a lower network address to a device with a higher network address.

Note that in the approach shown in FIG. 2 a Connection Policy is used to establish a security association instead of a Process Data Policy. This is done due to the nature of real-time process data publications and the adverse effects on multiple control applications in a typical non-client/server environment. For example, the use of a Process Data Policy only to establish secure communications could require halting process communications on the other end of a connection. The use of a Connection Policy helps to avoid this type of problem.

Although FIG. 2 illustrates one example of a technique for establishing seamless secure communications between components in an industrial process control and automation system, various changes may be made to FIG. 2. Also, although FIG. 3 illustrates one example of a technique for initiating secure channel negotiations between components in an industrial process control and automation system, various changes may be made to FIG. 3. For example, the relative lengths of times shown in FIG. 2 are for illustration only. As another example, while secure channel negotiations are shown as being initiated by the device with the lower IP address in FIG. 3, other techniques could be used to avoid negotiation thrashing. For instance, the device with the higher IP address could send the first message to start IKE negotiations.

Figure 4:
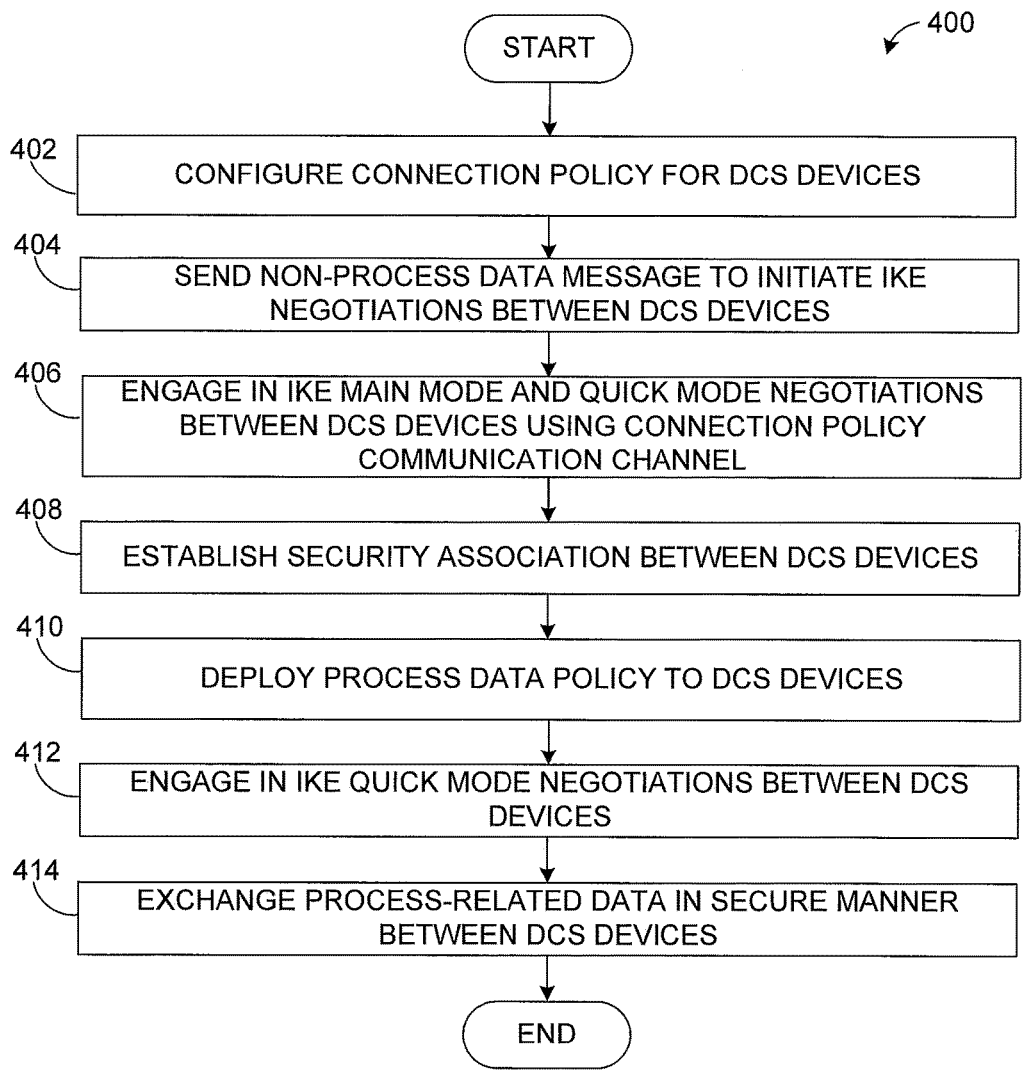
FIG. 4 illustrates an example method for establishing seamless secure communications between components in an industrial process control and automation system according to this disclosure.

FIG. 4 illustrates an example method 400 for establishing seamless secure communications between components in an industrial process control and automation system according to this disclosure. For ease of explanation, the method 400 is described with respect to the DCS devices 202-204 operating in the system 100 of FIG. 1. The method 400 could be used by any other suitable devices and in any other suitable system.

As shown in FIG. 4, a Connection Policy is configured for the DCS devices at step 402. This could include, for example, a user defining the type of secure communication channel to be used between the DCS devices 202-204. Negotiations between the DCS devices are initiated at step 404. This could include, for example, the DCS device 202 transmitting a non-process data message 206 to a specific non-process communication port of the DCS device 204. This causes the DCS nodes to engage in Main Mode and Quick Mode negotiations at step 406. These negotiations establish a security association between the DCS devices using the Connection Policy's communication channel at step 408. A Process Data Policy is deployed to the DCS devices at step 410. This could include, for example, the DCS nodes 202-204 receiving information defining the Process Data Policy from any suitable source. This causes the DCS nodes to engage in Quick Mode negotiations (but not Main Mode negotiations) at step 412.

At this point, a secure communication channel is established between the DCS devices, and process-related data is exchanged between the DCS devices in a secure manner at step 414. This could include, for example, the DCS nodes 202-204 exchanging encrypted data messages. The DCS devices 202-204 could communicate in an unsecure manner prior to the deployment of the Process Data Policy and in a secure manner after the deployment of the Process Data Policy. Ideally, little or no process-related data is lost during the switchover from the unsecure communications to the secure communications.

Although FIG. 4 illustrates one example of a method 400 for establishing seamless secure communications between components in an industrial process control and automation system, various changes may be made to FIG. 4. For example, while shown as a series of steps, various steps in FIG. 4 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   establishing, using a connection policy at a first device, a security association with a second device of an industrial process control and automation system; and
   once the security association is established, activating a process data policy at the first device;
   wherein the security association is established during first and second negotiations of first and second types of negotiations, respectively, and the process data policy is activated during a third negotiation of the second type of negotiation without using the first type of negotiation, the second type of negotiation faster than the first type of negotiation;
   wherein the connection policy defines a communication channel between the devices using a non-process communication port of the first device; and
   wherein the process data policy defines a communication channel between the devices for real-time industrial process data.

2. The method of claim 1, wherein:
   the first type of negotiation comprises an Internet Key Exchange (IKE) main mode negotiation; and
   the second type of negotiation comprises an IKE quick mode negotiation.

3. The method of claim 1, further comprising:
   sending a data message from the first device to the second device to initiate the establishment of the security association, the first device directing the data message to a non-process communication port of the second device.

4. The method of claim 3, further comprising:
   determining that the first device has a lower network address than the second device;
   wherein the data message is sent to the second device in response to determining that the first device has the lower network address.

5. The method of claim 1, further comprising:
   receiving a data message at the first device from the second device to initiate the establishment of the security association.

6. The method of claim 1, wherein:
   prior to activating the process data policy, the first device communicates with the second device using unencrypted data messages;
   after activating the process data policy, the first device communicates with the second device using encrypted data messages; and
   encryption of the encrypted data messages is based on the third negotiation.

7. The method of claim 1, wherein no process data publications from the second device are lost during activation of the process data policy.

8. The method of claim 1, wherein the process data policy is activated concurrently at the first and second devices.

9. An apparatus comprising a first distributed control system (DCS) device, the first DCS device comprising:
   at least one interface configured to communicate with a second DCS device; and
   at least one processing device configured to:
      establish, using a connection policy, a security association with the second DCS device; and
      once the security association is established, activate a process data policy;
   wherein the at least one processing device is configured to establish the security association during first and second negotiations of first and second types of negotiations, respectively, and to activate the process data policy during a third negotiation of the second type of negotiation without using the first type of negotiation, the second type of negotiation faster than the first type of negotiation;
   wherein the connection policy defines a communication channel between the DCS devices using a non-process communication port of the first DCS device; and
   wherein the process data policy defines a communication channel between the DCS devices for real-time industrial process data.

10. The apparatus of claim 9, wherein:
    the first type of negotiation comprises an Internet Key Exchange (IKE) main mode negotiation; and
    the second type of negotiation comprises an IKE quick mode negotiation.

11. The apparatus of claim 9, wherein:
the at least one processing device is further configured to initiate transmission of a data message to the second DCS device to initiate the establishment of the security association; and
the at least one interface is configured to direct the data message to a non-process communication port of the second DCS device.

12. The apparatus of claim 9, wherein the at least one processing device is further configured to receive via the at least one interface a data message from the second DCS device to initiate the establishment of the security association.

13. The apparatus of claim 9, wherein:
prior to activating the process data policy, the first DCS device is configured to communicate with the second DCS device using unencrypted data messages;
after activating the process data policy, the first DCS device is configured to communicate with the second DCS device using encrypted data messages; and
encryption of the encrypted data messages is based on the third negotiation.

14. The apparatus of claim 9, wherein the first DCS device comprises an industrial process controller.

15. A non-transitory computer readable medium containing a computer program, the computer program comprising computer readable program code that when executed causes at least one processing device to:
establish, using a connection policy at a first device, a security association with a second device of an industrial process control and automation system; and
once the security association is established, activate a process data policy at the first device;
wherein the security association is established during first and second negotiations of first and second types of negotiations, respectively, and the process data policy is activated during a third negotiation of the second type of negotiation without using the first type of negotiation, the second type of negotiation faster than the first type of negotiation;
wherein the connection policy defines a communication channel between the devices using a non-process communication port of the first device; and
wherein the process data policy defines a communication channel between the devices for real-time industrial process data.

16. The non-transitory computer readable medium of claim 15, wherein:
the first type of negotiation comprises an Internet Key Exchange (IKE) main mode negotiation; and
the second type of negotiation comprises an IKE quick mode negotiation.

17. The non-transitory computer readable medium of claim 15, wherein the computer program further comprises computer readable program code that when executed causes the at least one processing device to send a data message from the first device to a non-process communication port of the second device to initiate the establishment of the security association.

18. The non-transitory computer readable medium of claim 17, wherein:
the computer program further comprises computer readable program code that when executed causes the at least one processing device to determine that the first device has a lower network address than the second device; and
the computer readable program code that when executed causes the at least one processing device to send the data message comprises computer readable program code that when executed causes the at least one processing device to send the data message in response to determining that the first device has the lower network address.

19. The non-transitory computer readable medium of claim 15, wherein the computer program further comprises computer readable program code that when executed causes the at least one processing device to receive a data message from the second device to initiate the establishment of the security association.

20. The non-transitory computer readable medium of claim 15, wherein:
prior to activating the process data policy, the first device communicates with the second device using unencrypted data messages;
after activating the process data policy, the first device communicates with the second device using encrypted data messages; and
encryption of the encrypted data messages is based on the third negotiation.

* * * * *